(12) United States Patent
Matsushita et al.

(10) Patent No.: US 8,233,715 B2
(45) Date of Patent: Jul. 31, 2012

(54) PROBABILISTIC INTENSITY SIMILARITY MEASURE BASED ON NOISE DISTRIBUTIONS

(75) Inventors: Yasuyuki Matsushita, Beijing (CN); Stephen Ssu-te Lin, Beijing (CN)

(73) Assignee: Microsoft Corporation, Redmond, WA (US)

( * ) Notice: Subject to any disclaimer, the term of this patent is extended or adjusted under 35 U.S.C. 154(b) by 878 days.

(21) Appl. No.: 12/110,362

(22) Filed: Apr. 28, 2008

(65) Prior Publication Data

US 2009/0268938 A1 Oct. 29, 2009

(51) Int. Cl.
*G06K 9/46* (2006.01)
(52) U.S. Cl. ........ 382/190; 382/100; 382/181; 382/209; 382/217; 382/218; 348/241
(58) Field of Classification Search .................. 382/100, 382/181, 190, 209, 217, 218; 348/241
See application file for complete search history.

(56) References Cited

U.S. PATENT DOCUMENTS

| | | | |
|---|---|---|---|
| 7,020,311 B2 | 3/2006 | Breeuwer | |
| 7,113,268 B2 | 9/2006 | Gerwe et al. | |
| 7,246,314 B2 | 7/2007 | Foote et al. | |
| 2003/0095197 A1* | 5/2003 | Wheeler et al. | 348/241 |
| 2003/0108250 A1* | 6/2003 | Luo et al. | 382/263 |
| 2004/0066978 A1* | 4/2004 | Nanbu | 382/261 |
| 2004/0103130 A1 | 5/2004 | Ivanisevic et al. | |
| 2005/0152617 A1 | 7/2005 | Roche | |
| 2005/0228591 A1 | 10/2005 | Hur et al. | |
| 2005/0238198 A1 | 10/2005 | Brown et al. | |
| 2006/0002632 A1 | 1/2006 | Fu et al. | |
| 2007/0147677 A1 | 6/2007 | Matsushita et al. | |
| 2007/0279650 A1 | 12/2007 | Zitnick | |

OTHER PUBLICATIONS

Cham, et al., "A Statistical Framework for Long-Range Feature Matching in Uncalibrated Image Mosaicing", IEEE Computer Society Conference on Computer Vision and Pattern Recognition, 1998, pp. 1-6.
Alter, et al., "An Intensity Similarity Measure in Low-Light Conditions", Proc. ECCV 2006, Association for Computing Machinery, Inc, 2006, pp. 14.
Comaniciu, et al., "Robust Analysis of Feature Spaces: Color Image Segmentation", Proceedings of the 1997 Conference on Computer Vision and Pattern Recognition (CVPR '97), 1997, pp. 1-8.
Healey, et al., "Radiometric CCD Camera Calibration and Noise Estimation", IEEE Transaction on Pattern Analysis and Machine Intelligence, vol. 16, No. 3, Mar. 1994, pp. 267-276.
Liu, et al., "Noise Estimation from a Single Image", IEEE Conference on Computer Vision and Pattern Recognition, 2006, vol. 1, pp. 8.

(Continued)

*Primary Examiner* — John Lee
(74) *Attorney, Agent, or Firm* — L. Alan Collins; Collins & Collins Intellectual, LLC (57) ABSTRACT

Technologies for comparing observed intensities using a probabilistic similarity measure. In the probabilistic similarity measure example, there is no attempt to estimate a true intensity. Rather, the similarity of two observed intensities is defined as the likelihood that they each resulted from the same but unknown true identity while taking into account the noise characteristics of the camera observing the intensities. Since the true intensity is unknown, all possible true intensities are taken into account, rather than using a specific true intensity estimate. The probabilistic similarity measure indicates the degree to which two intensities correspond to the same intensity without estimating a true scene intensity value.

17 Claims, 6 Drawing Sheets

OTHER PUBLICATIONS

Omer, et al., "Color Lines: Image Specific Color Representation", Proceedings of the 2004 IEEE Computer Society Conference on Computer Vision and Pattern Recognition, vol. 2, 2004, pp. 1-8.

Omer, et al., "The Bottleneck Geodesic: Computing Pixel Affinity", Proceedings of the 2006 IEEE Computer Society Conference on Computer Vision and Pattern Recognition (CVPR'06), IEEE, 2006, pp. 7.

Omer, et al., "Image Specific Feature Similarities", Proceedings of the European Conference on Computer Vision, vol. 3952, 2006, Springer Berlin / Heidelberg, pp. 1-13.

Patras, et al., "Confidence Measures for Block Matching Motion Estimation", International Conference on Image Processing, vol. 2, IEEE, 2002, pp. 277-280.

Rattray, "A Model-based Distance for Clustering", Neural Networks, Proceedings of the IEEE-INNS-ENNS International Joint Conference, 2000, vol. 4, pp. 4.

Fowlkes, "Learning Affinity Functions for Image Segmentation: Combining Patch-based and Gradient-based Approaches", Proc. of CVPR, vol. 2, Jun. 2003.

Frahn, "Comparison of X-Ray Image Registration Techniques across Rotation and Translation", Proc. 16th Annu. Symp. Pattern Recognition Assoc. of South Africa, Nov. 2005.

Rogelj, "Similarity Measures for Non-rigid Registration", http://spiedigitallibrary.org/proceedings/resource/2/psisdg/4322/1/569_1?isAuthorized=no, Feb. 19, 2001.

\* cited by examiner

PROBABILISTIC INTENSITY SIMILARITY MEASURE BASED ON NOISE DISTRIBUTIONS

BACKGROUND

A fundamental operation in computer vision is to compare two pixels to determine whether they indicate a similar intensity value or a similar color value or the like. Accurate measurement and comparison of light intensity at a camera's pixels depends on the noise characteristics of the camera. Due to these noise characteristics, the measured values of the pixels in a digital image may fluctuate over some range around the actual intensity values. The characteristics of this fluctuation may vary from camera to camera, from pixel to pixel in the same camera, and even within the same pixel. Accordingly, measuring how similar two pixels are to each other must be done while considering the noise characteristics of a camera and their impact on the pixel values. Conventional similarity comparison techniques, such as $L^2$ norm and the like, tend to be lacking with respect to the impact of camera noise characteristics on intensity.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for comparing observed intensities using a probabilistic similarity measure. In the probabilistic similarity measure example, there is no attempt to estimate a true intensity. Rather, the similarity of two observed intensities is defined as the likelihood that they each resulted from the same but unknown true identity while taking into account the noise characteristics of the camera observing the intensities. Since the true intensity is unknown, all possible true intensities are taken into account, rather than using a specific true intensity estimate. The probabilistic similarity measure indicates the degree to which two intensities correspond to the same intensity without estimating a true scene intensity value.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments, electronic systems, or the like.

Intensity similarity measurement is one of the most important and fundamental computer vision operations. Such measurements are typically performed by comparing the intensity values on pixels of a digital image or of two or more digital images (such as when scanning one image for an element that is in another image, or the like). One method of comparing intensity values is based on the conventional $L^2$ norm measure which typically involves squaring the distance between two measured intensity values, $I_1$ and $I_2$. While such a squared distance metric may provide a valid comparison in theory, the quality of this measure lessens in practice due to the presence of noise in real images, the noise being unaccounted for by the measure.

Imaging noise typically produces various perturbations of intensity values that tend to degrade the visual quality of digital images and reduce the reliability of computer vision algorithms. Even when the noise characteristics of an image are known, it may be difficult to remove noise in a manner that preserves the actual scene information in the measured intensity signal. In general, there does not exist sufficient information in an image to extract the original scene data. Therefore noise reduction typically cannot be performed accurately, often leading to loss of image detail and/or the introduction of image artifacts.

One significant source of imaging noise is the camera itself. Noise is introduced into intensity observations at multiple points along the imaging pipeline of a camera. The terms "noise" and "imaging noise" and the like as used herein generally refer to disturbances that cause an observed intensity value to vary from the actual intensity of a scene. Prominent sources of noise may include random noise associated with analog to digital ("A/D") conversion and uneven photon flow from the original scene, fixed pattern noise due to differences in sensitivity among photon detectors in the imaging array, and dark current noise that results from measurement of thermal radiation within the camera. Alternatively or additionally, other sources of imaging noise may affect observed image intensity.

Figure 1:
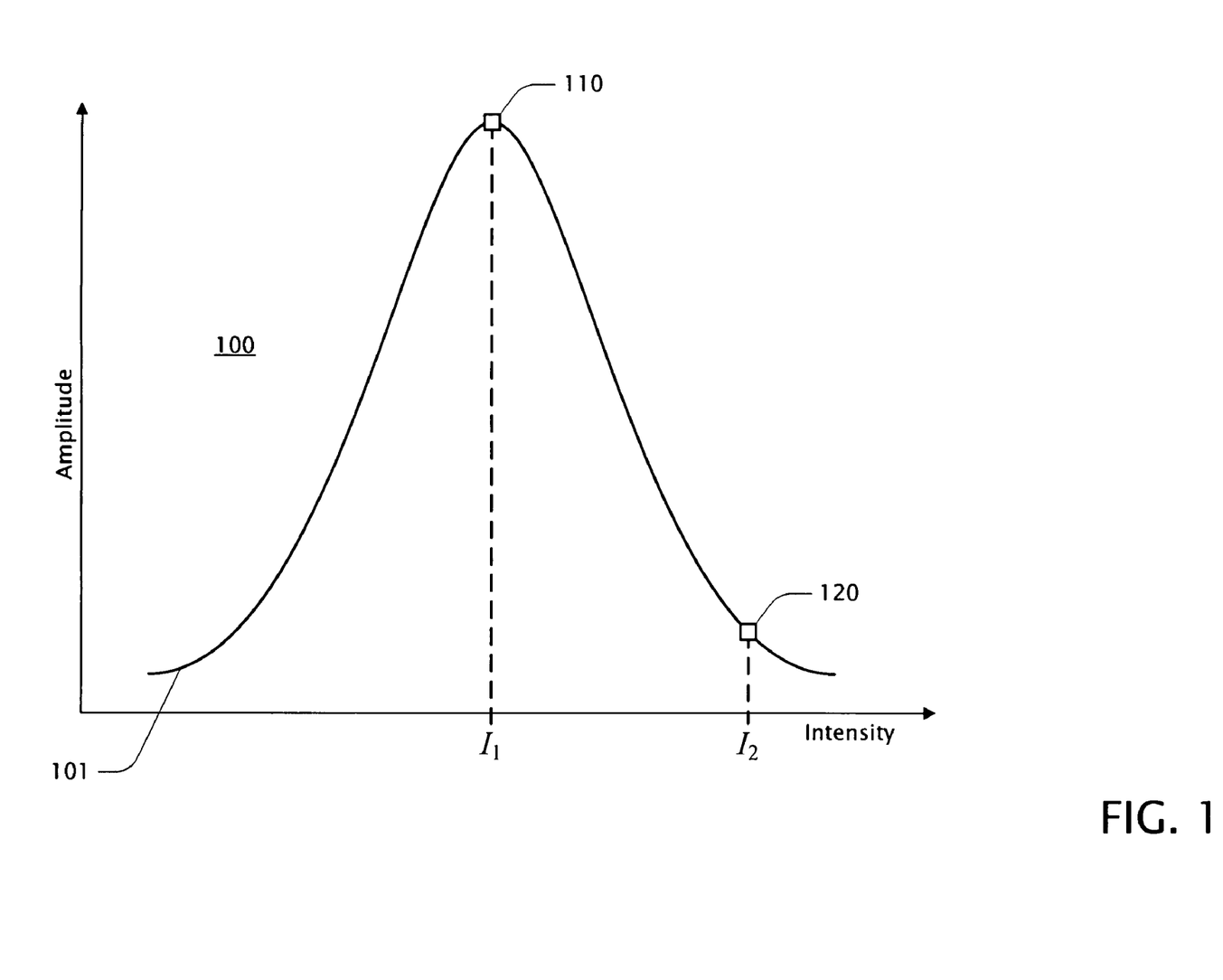
FIG. 1 is a diagram illustrating an example conventional technique of comparing intensity values using a Gaussian similarity measure.

FIG. 1 is a diagram illustrating another example conventional technique 100 of comparing intensity values using a Gaussian similarity measure. With this measure, as with the $L^2$ norm measure, two intensity values are being compared, $I_1$ and $I_2$. Typically, one of the two values is assumed to be correct, to represent the actual intensity of a scene. For example, intensity $I_1$ of FIG. 1 represents the observed intensity that is assumed to be correct. To make the comparison, example Gaussian curve 101 is centered on intensity $I_1$ (the value assumed to be correct) at point 110 and then the amplitude at intensity $I_2$ is read off Gaussian curve 101 at point 120. The amplitude difference between points 110 and 120 on Gaussian curve 101, or the square of the distance, typically represents a measure of similarity between intensities $I_1$ and $I_2$. Typically, the smaller the difference (or square of the distance), the more similar the intensity values $I_1$ and $I_2$. In practice, an arbitrary threshold may be established and, if the difference is less than the threshold, then the intensity values $I_1$ and $I_2$ may be considered similar.

Note that the Intensity axis of FIG. 1 represents a range of intensity. As known to those of skill in the art, pixel values of a digital image are typically discrete values within such a range. For example, a grayscale intensity range may be represented using 8 bits to provide 256 possible grayscale intensity values ranging from 0 to 255. Similar representations may be used for different color intensity ranges, such as for the intensity of each of red, green, and blue ("RGB") or the like. Alternatively, other scales or bit counts or value ranges may be used to represent various types of scene intensity.

The Gaussian similarity measure, like the $L^2$ norm measure, does little to take imaging noise into account. A noise reduction or removal processing stage may be applied to an image prior to using a Gaussian similarity measure, still providing less than satisfactory results for at least the reasons described herein above. While such a Gaussian similarity measure may provide a valid intensity comparison in theory, the quality of this measure lessens in practice due to the presence of noise in real images, the noise being unaccounted for by the measure. Further, the assumption that one of the observed intensities is correct may, in most cases, be false, particularly when considering real-world imaging noise. Basing the similarity measure on such an assumption further lessens the quality of the Gaussian similarity measure.

Figure 2:
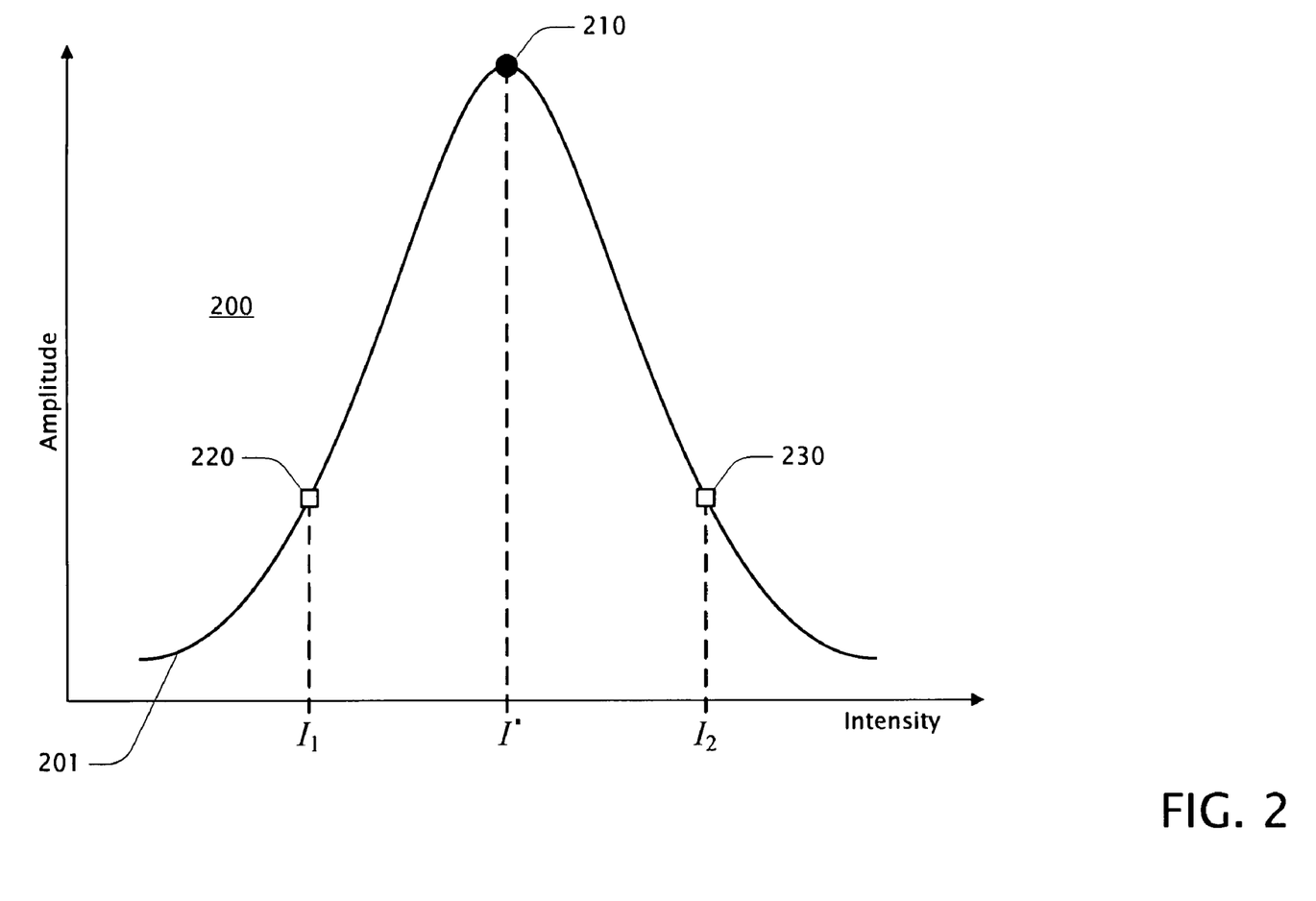
FIG. 2 is a diagram illustrating an example technique of comparing intensity values using an estimate from a Maximum Likelihood ("ML") similarity measure.

FIG. 2 is a diagram illustrating another example technique 200 of comparing intensity values using an estimate from a Maximum Likelihood ("ML") similarity measure. In this example, the ML estimation is used to define the similarity between two intensity observations. The ML similarity measure tries to estimate a maximum likelihood intensity value I' based on two observed intensities $I_1$ and $I_2$ and then derives the similarity as the product of conditional probabilities $p(I_1|I')p(I_2|I')$. In one example, example curve 201 is centered on the estimated maximum likelihood intensity value I' at point 210. Curve 201 may be a Gaussian curve or curve that may be shaped to account for imaging noise. Observed intensities $I_1$ and $I_2$ are plotted on the Intensity axis and the amplitudes at points 220 and 230 where the intensities intersect curve 201 are noted. The two amplitude values at points 220 and 230 may then be multiplied together resulting in the product representing the similarity measure. Given a peak amplitude value of 1 at point 210, for example, the closer the product is to 1, then the greater the similarity between the two intensities $I_1$ and $I_2$. In practice, given this example, an arbitrary threshold of less than 1 may be established and, if the product is greater than the threshold, then the intensity values $I_1$ and $I_2$ may be considered similar.

While the ML similarity measure may account for aspects of imaging noise, it is primarily based on an elementary intensity estimate I', the estimate being based on two observed intensities $I_1$ and $I_2$. While the ML similarity measure is, in principle, an improvement over the Gaussian similarity measure and the $L^2$ norm measure, the quality of this measure lessens in practice due to the elementary quality of intensity estimate I'.

Figure 3:
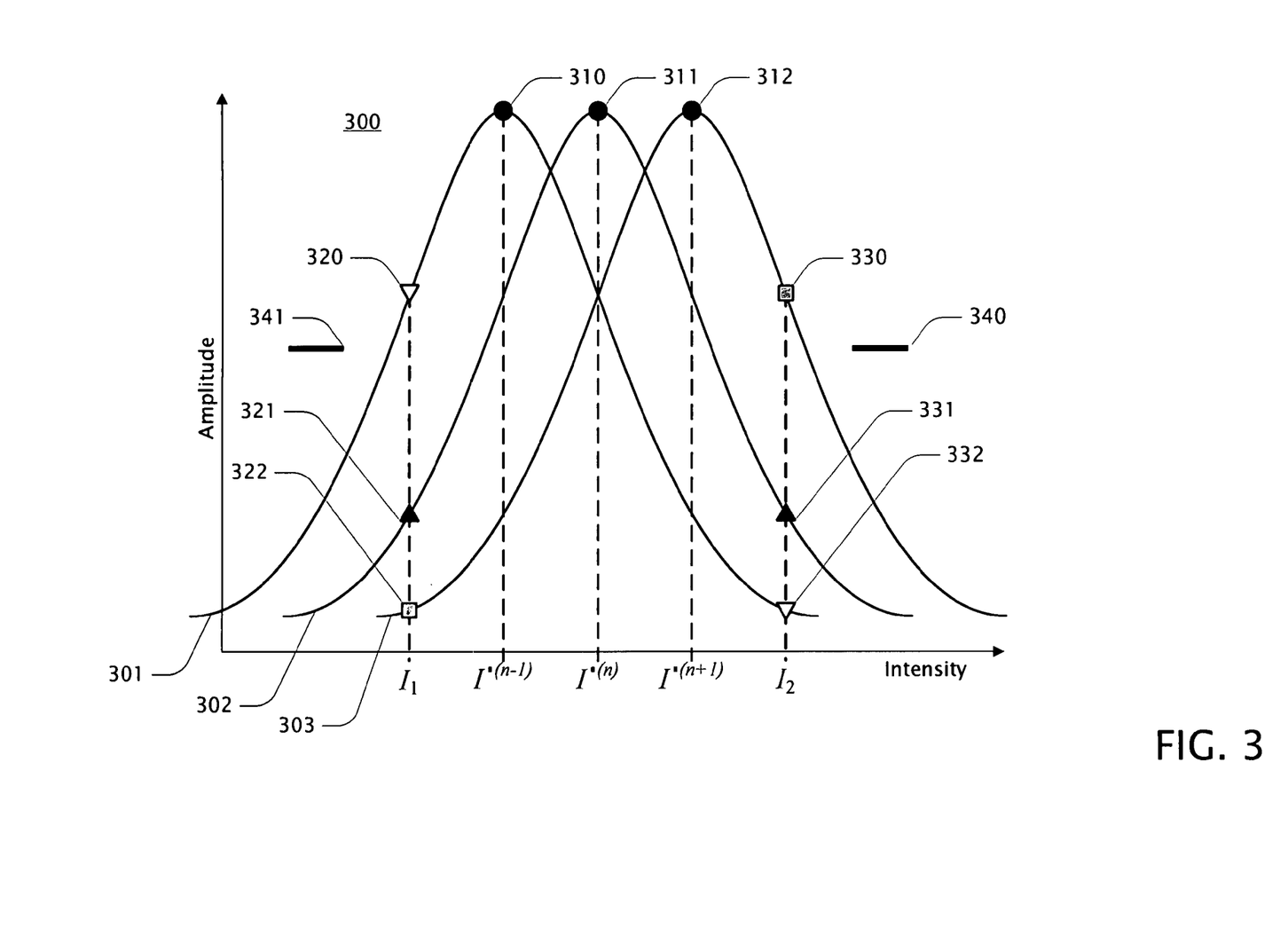
FIG. 3 is a diagram illustrating an example technique of comparing intensity values using a probabilistic similarity measure.

FIG. 3 is a diagram illustrating an example technique 300 of comparing intensity values using a probabilistic similarity measure. In this example, all possible scene intensities are considered as possibly being the true scene intensity. For example, given a measurable range of grayscale values from 0 to 255, each of these intensity values is considered as the possible true scene intensity. Because the true scene intensity is unknown (due to imaging noise, for example), all possible intensities in the measurable range are considered when comparing two intensities $I_1$ and $I_2$.

In many computer vision algorithms, the effect of camera noise is either neglected or reduced in a noise reduction stage of processing. Since imaging noise generally arises from a series of stochastic processes, it may be feasible to treat intensity observations as samples from a probability distribution defined by these intensity fluctuations. Such noise distributions may vary among pixels in the image, and can also be dependent on intensity level.

In the probabilistic similarity measure example, there is no attempt to estimate a true intensity. Rather, the similarity of two observed intensities $I_1$ and $I_2$ is defined as the likelihood that they each resulted from the same but unknown true identity I', i.e., $p(I_1|I')p(I_2|I')$. Since the true intensity is unknown, all possible true intensities are taken into account, rather than using a specific true intensity estimate. Accordingly, the probabilistic similarity measure for a single color (e.g., grayscale) may be formulated as:

$$S(I_1, I_2) \stackrel{def}{=} p(t(I_1) = t(I_2)) \quad \text{Equation (1)}$$
$$= \int_\Omega p(I_2|I')p(I_2|I')p(I')dI',$$

where $S(I_1, I_2)$ is a probability that observed intensities $I_1$ and $I_2$ correspond to the same intensity, and where $\Omega$ represents the set of all possible true intensity values (e.g., 0-255 given a 256 value range), and where t(I) is the true intensity of observation I, and p(I') is the prior density of the true intensity, which is uniform (e.g., a constant). Alternatively, p(I') may be a value based on information about scene radiance I. With this definition in the form of marginal densities, the probabilistic similarity measure is able to avoid the uncertainty that exists in the estimation of a single true intensity. In general, the closer $S(I_1, I_2)$ is to 1, then the greater the similarity between the two intensities $I_1$ and $I_2$. In practice, an arbitrary threshold of less than 1 may be established and, if probability $S(I_1, I_2)$ is greater than the threshold, then the intensity values $I_1$ and $I_2$ may be considered to correspond to the same intensity value.

The probabilistic similarity measure is formulated as a marginal density of the likelihood function over the parameter I' as shown in Equation (1) in which an entire set of possible likelihood functions is used. The marginal likelihood is computed using the likelihood functions with the associated prior distributions of the parameters and uses all possible likelihood functions $p(I_1|I')p(I_2|I')$ instead of relying in a specific parameter as with the ML similarity measure.

Considering illustration 300, each curve (such as example curves 301, 302, and 303) typically represents the true noise characteristics of the camera used to observe scene intensity; each curve is typically based on the measured noise characteristics of the camera. Intensities $I_1$ and $I_2$ represent the two observed intensities being compared. Possible true intensities $I'^{(n-1)}$, $I'^{(N)}$, and $I'^{(n+1)}$ represent three of the total number of possible true intensity values that can be measured by the camera. For example, given a measurable range of grayscale intensity values from 0 to 255, possible true intensity value $I'^{(n-1)}$ may equal 99 with value $I'^{(n)}$ equaling 100 and value $I'^{(n+1)}$ equaling 101. Ellipses 340 and 341 indicate considering every possible true intensity value by centering a curve on the Intensity axis over each possible intensity value, e.g., such as at points 310, 311, and 312. In the case of 256 possible intensity values, a curve is centered over each value. The integral in Equation (1) considers each of the possible true intensity values (each of the intensity values in the range of measurable intensity values) as indicated by the three example curves 310, 311, and 312 and the ellipses 340 and 341.

Each possible intensity value (e.g., ..., $I'^{(n-1)}$, $I'^{(n)}$, $I'^{(n+1)}$, ...) may be considered equally likely to be the true intensity value for a particular observation. This is indicated for each intensity value by the p(I') term in Equation (1), that may be set to a constant such as 1/256 (0.00390625) given the example of 256 possible intensity values. Alternatively, additional information may be available suggesting that one or more intensity values are more or less probable than are others and Equation (1) may be modified accordingly.

For each possible true intensity value, observed intensities $I_1$ and $I_2$ are plotted on the Intensity axis and the amplitudes on the corresponding curve are noted. For example, when considering intensity $I'^{(n-1)}$ as the possible true intensity value, example curve 301 is centered on value $I'^{(n-1)}$ at point 310 and observed intensities $I_1$ and $I_2$ are plotted on the Intensity axis and the amplitudes at points 320 and 332 where the intensities intersect curve 301 are noted. The two amplitude values at points 320 and 332 may then be multiplied together resulting in the product representing the similarity measure. Given a peak amplitude value of 1 at point 310, for example, the closer the product is to 1, then the greater the similarity between the two intensities $I_1$ and $I_2$. In practice, given this example, an arbitrary threshold of less than 1 may be established and, if the product is greater than the threshold, then the intensity values $I_1$ and $I_2$ may be considered similar.

Further, curve 302 centered at point 311 and intersecting points 321 and 331 may be used to determine the probability that observed intensities $I_1$ and $I_2$ correspond to possible true intensity value $I'^{(n)}$, and curve 303 centered at point 312 and intersecting points 322 and 330 may be used to determine a probability of correspondence, the probability that observed intensities $I_1$ and $I_2$ correspond to possible true intensity value $I'^{(n+1)}$. In general, this determination process may be applied to each possible intensity value (..., $I'^{(n-1)}$, $I'^{(n)}$, $I'^{(n+1)}$, ...) in set Ω and the results integrated as shown in Equation (1) to produce the probabilistic similarity measure, a probability that observed intensities $I_1$ and $I_2$ correspond to the same intensity value. Note that the probabilistic similarity measure is made without estimating a true scene intensity value.

The probabilistic similarity measure may be applied to grayscale intensities or to other color intensities, such as for the intensity of each of red, green, and blue ("RGB") or the like. Further, the similarity measure for pixel intensity can be directly expanded to handle pixel features represented as vector quantities, such as color or local texture attributes. Using RGB as an example, the similarity between vectors $v_1=[r_1, g_1, b_1]$ and $v_2=[r_2, g_2, b_2]$ may be expressed as:

$$S(v_1, v_2) = \int_{\Omega_v} p(v_1 \mid v')p(v_2 \mid v')pv'dv' \quad \text{Equation (2)}$$
$$= \int_{\Omega_b}\int_{\Omega_g}\int_{\Omega_r} p(r_1 \mid r')p(g_1 \mid g')p(b_1 \mid b')$$
$$p(r_2 \mid r')p(g_2 \mid g')p(b_2 \mid b')p(r')$$
$$p(g')p(b')dr'dg'db'$$
$$= S(r_1, r_2) \cdot S(g_1, g_2) \cdot S(b_1, b_2).$$

where $S(v_1, v_2)$ is a probability that observed intensity vectors $v_1$ and $v_2$ correspond to the same intensity, and where $\Omega_v$ represents the set of all possible true intensity values (e.g., 0-255 given a 256 value range) for each color in the vector (e.g., red, green, and blue). Note that intensity vectors of the same form of any size may be compared by adjusting Equation (2) to include an integral for each element of the vectors to be compared. Other elements of Equation (2) are similar to related elements of Equation (1). As with Equation (1), the closer $S(v_1, v_2)$ is to 1, then the greater the similarity between the two intensity vectors $v_1$ and $v_2$. In practice, an arbitrary threshold of less than 1 may be established and, if probability $S(v_1, v_2)$ is greater than the threshold, then the intensity vectors $v_1$ and $v_2$ may be considered to correspond to the same intensity value. In general, in any scenario that Equation (1) can be used to compare single-color intensity values or the like, Equation (2) can be used to compare intensity vectors or the like.

The probabilistic similarity measure may further be applied to subpixel and multi-resolution cases. There are many computer vision algorithms that utilize subpixel and multi-resolution matching schemes, e.g., image alignment and optical flow and the like. In the subpixel case, for example, if Pixel A of Image 1 happens to overlap Pixels X and Y of Image 2, then a weighted average of the intensities of Pixels X and Y can be taken to compare with the intensity of Pixel A. That is, for example, if Pixel A overlaps 30% of Pixel X and 70% of Pixel Y, then a 30/70 weighted average of the intensities of Pixels X and Y respectively would be compared to the intensity of Pixel A using the probabilistic similarity measure. Similarly, in an example multi-resolution case, if Pixel B of Image 3 overlaps Pixels J, K, L, and M of Image 4 (or portions thereof), then a weighted average of the intensities of Pixels J, K, L, and M (or the portions thereof) can be taken to compare with the intensity of Pixel B using the probabilistic similarity measure. Such pixel weighted averaging techniques can be applied to subpixel and/or multi-resolution cases for comparing single-color intensity values or multi-color intensity vectors or the like.

The terms "true scene intensity" and "true intensity value" as used herein generally refers to the actual scene radiance within the measurable intensity range of the camera. These values are typically perturbed by imaging noise before being represented in a digital image. The term "possible true intensity values" as used herein generally refers to the discrete intensity values of the set or range of measurable intensity values Ω or the like. The term "observed intensity value" or the like generally refers to an intensity value based on scene radiance and potentially impacted imaging noise. The terms "noise curve" and "curve" as used herein typically refer to a representation of the noise characteristics of a camera providing the observed intensity values. Further, intensity values or vectors being compared may come from the same or different sources. In one example, the source may be a single digital image. In another example, the intensities being compared may come from different images or from any source capable of providing intensities useful for comparison.

Figure 4:
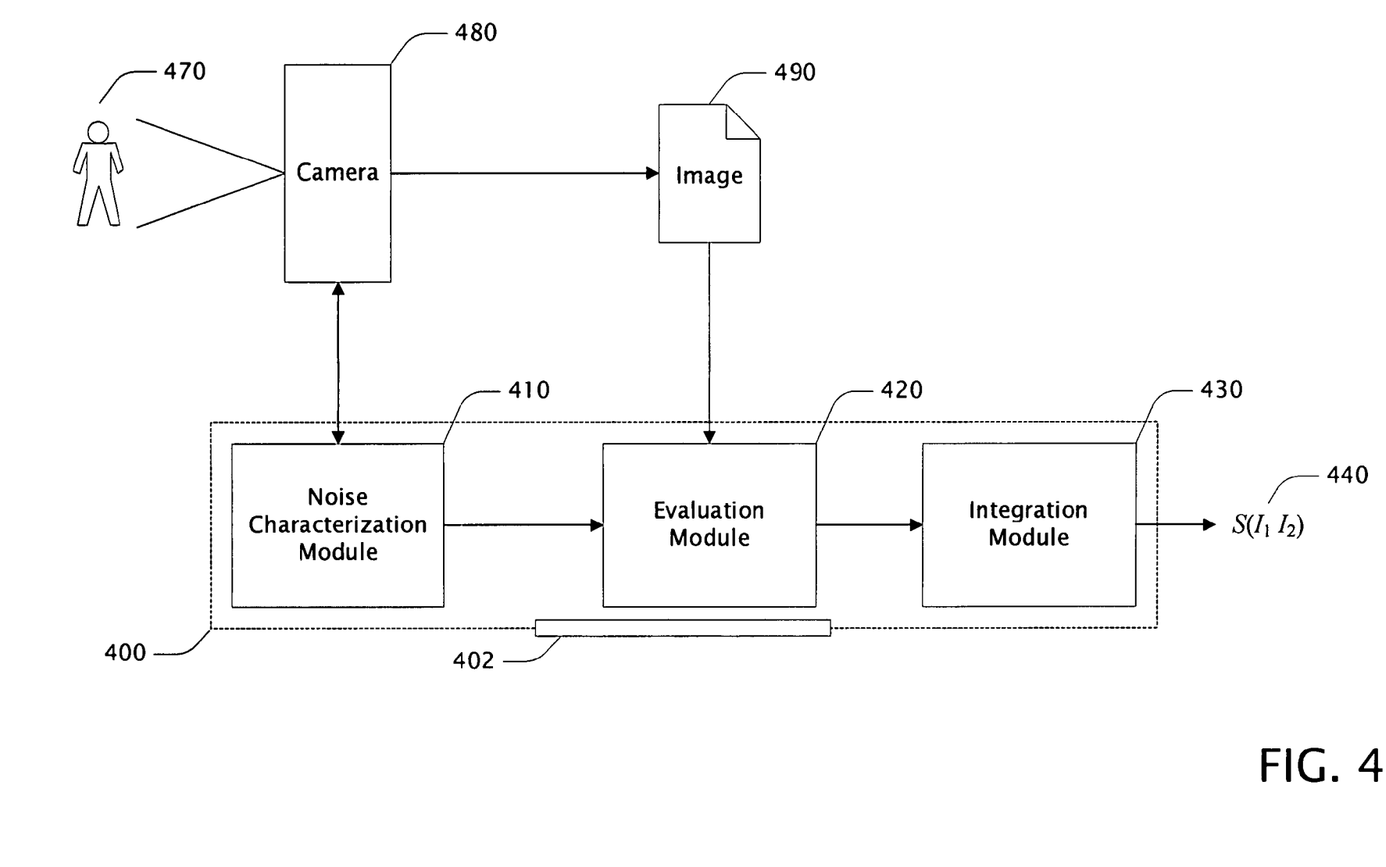
FIG. 4 is a block diagram showing an example system for generating a probabilistic similarity measure.

FIG. 4 is a block diagram showing an example system 400 for generating a probabilistic similarity measure. System 400 typically operates in conjunction with some conventional digital camera 480 that produces example digital image 490 of some scene 470. Radiance from scene 470 is (true scene intensities are) detected by camera 480 which generally introduces imaging noise that degrades the quality of resulting digital image 490. Camera 480 typically detects scene intensities within a range of grayscale and/or color intensities. In one example, such a range includes 256 intensity values per color detected. System 400 compares pairs of scene intensities (e.g., $I_1$ and $I_2$) from example digital image 490 and/or from other sources and generates a probabilistic similarity measure $S(I_1, I_2)$ 440 for each such pair as described in connection with FIG. 3. Control interface 402 enables external software and/or systems to control system 400 for purposes of making similarity comparisons between pixel intensities of one or more digital images, such as digital image 490. In one example, system 400 may be implemented as software modules for use with a computer system or the like such as that described in connection with FIG. 6. In an alternate example, system 400 may be implemented entirely in hardware, may be implemented in hardware including a processing element and firmware, or may be implemented using a combination of hardware, firmware, and/or software. Further, system 400 may be used to compare intensity vectors (using Equation (2) or the like) and/or subpixel or multi-resolution pixel intensities or vectors (using pixel weighted averages or the like) instead of or in addition to single-color intensity values.

Noise characterization module 410 typically determines the imaging noise characteristics of camera 480 using conventional techniques and represents the camera's noise characteristics in the form of a noise curve, such as curves 301, 302, and 303 of FIG. 3. The noise curve may be determined as part of a calibration step or process, including a one-time calibration step. In one example, the noise curve may be a Gaussian curve. In another example, the noise curve may be formed to represent the specific imaging noise characteristics of a particular camera. Such a noise curve may be represented in electronic, digital, and/or numeric form or any other suitable form. The noise curve is typically provided to comparison module 420.

Evaluation module 420 typically performs an evaluation of intensity values, such as example observed intensity values $I_1$ and $I_2$, of digital image 490. Alternatively, intensity values $I_1$ and $I_2$ can come from two different images or sources or the like. Further, intensity values $I_1$ and $I_2$ may alternatively be intensity vectors $v_1$ and $v_2$. Evaluation module 420 typically calculates a probability that observed intensities $I_1$ and $I_2$ correspond to the same intensity. Such a probability of correspondence is typically calculated for each possible true intensity in a set or range of measurable intensities, as described in connection with Equation (1) or (2) and FIG. 3. Each probability of correspondence is typically provided to integration module 430.

Integration module 430 typically integrates the probabilities of correspondence from evaluation module 420 resulting from an evaluation of intensity values, such as example pixel intensity values $I_1$ and $I_2$, as described in connection with Equation (1) and FIG. 3. The output of integration module 430 is typically a probabilistic similarity measure $S(I_1, I_2)$ 440.

In one example, system 400 can generate a probabilistic similarity measure for any two pixel intensity values. The specific pixel values to compare may be specified via control interface 402. In another example, system 400 may search digital image 490 for a specific match. For example, system 400 may search image 490 for a particular target, such as a coffee cup or any other object. The image data to be matched may be provided via control interface 402. An indication of a match, if found, may be provided to the controlling software or system via control interface 402.

Figure 5:
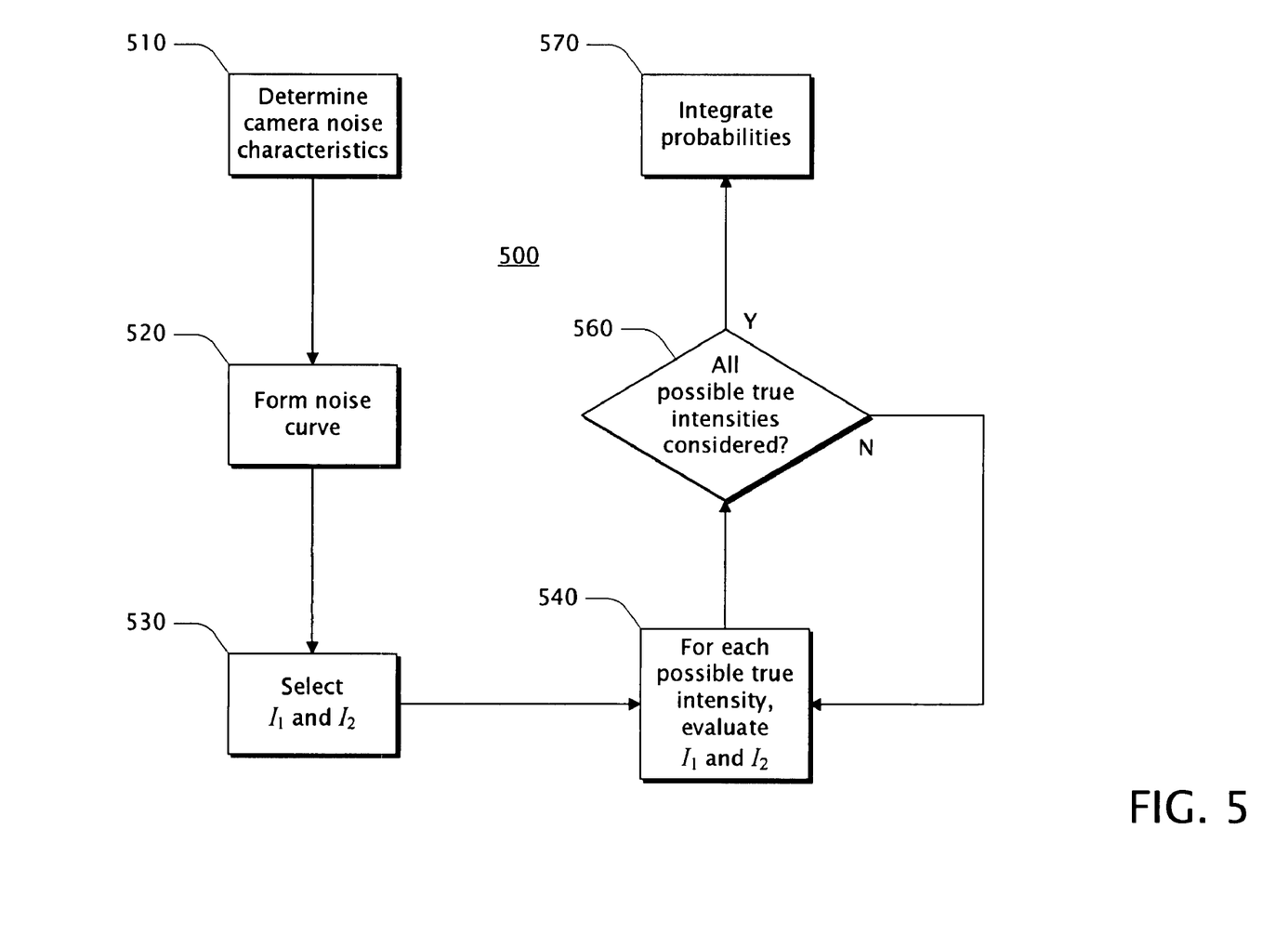
FIG. 5 is a block diagram showing an example method for generating a probabilistic similarity measure consistent with that described in connection with Equation (1) and FIG. 3.

FIG. 5 is a block diagram showing an example method 500 for generating a probabilistic similarity measure consistent with that described in connection with Equation (1) and FIG. 3. The result of method 500 is measure $S(I_1, I_2)$ of Equation (1) indicating the degree to which $I_1$ and $I_2$ both correspond to the same intensity. Further, method 500 may be used to compare intensity vectors (using Equation (2) or the like) and/or subpixel or multi-resolution pixel intensities or vectors (using pixel weighted averages or the like) instead of or in addition to single-color intensity values.

Block 510 typically indicates determining the imaging noise characteristics of the camera. In one example this is done using a conventional technique as part of a calibration step. Once the imaging noise characteristics of the camera have been determined, method 500 typically continues at block 520.

Block 520 typically indicates forming a noise curve that represents the imaging noise characteristics of the camera. In one example, the noise curve may be a Gaussian curve. In another example, the noise curve may be formed to represent the specific imaging noise characteristics of a particular camera. Such a noise curve may be represented in electronic, digital, and/or algorithmic form or any other suitable form. Once a noise curve has been formed that represents the noise characteristics of the camera, then method 500 typically continues at block 530.

Block 530 typically indicates selecting a pair of pixel intensity values of a digital image to compare, herein designated $I_1$ and $I_2$. Such observed intensity values may be selected by any suitable means, programmatically or otherwise. Once selected, method 500 typically continues at block 540.

Block 540 typically indicates evaluating $I_1$ and $I_2$ for each possible true intensity value. For example, given 256 possible intensity values, observed values are iteratively evaluated against each possible true intensity value 0 through 255. For each possible value a probability of correspondence is calculated as described in connection with FIGS. 3 and 4. Once a probability of correspondence is calculated for a particular possible true intensity value, then method 500 typically continues at block 560.

Block 560 typically indicates determining is a probability of correspondence has been calculated for each possible true intensity value, such as for values 0-255. If not, then method 500 typically continues back at block 540 for the next possible true intensity value. If so, then method 500 typically continues at block 570.

Block 570 typically indicates integrating all probabilities of correspondence in accordance with Equation (1) and FIGS. 3 and 4 to generate a probabilistic similarity measure indicating the probability that $I_1$ and $I_2$ correspond to the same intensity value. Given a sufficiently high probability, then $I_1$ and $I_2$ may be considered similar. At this point, the steps of method 500 are typically complete.

Figure 6:
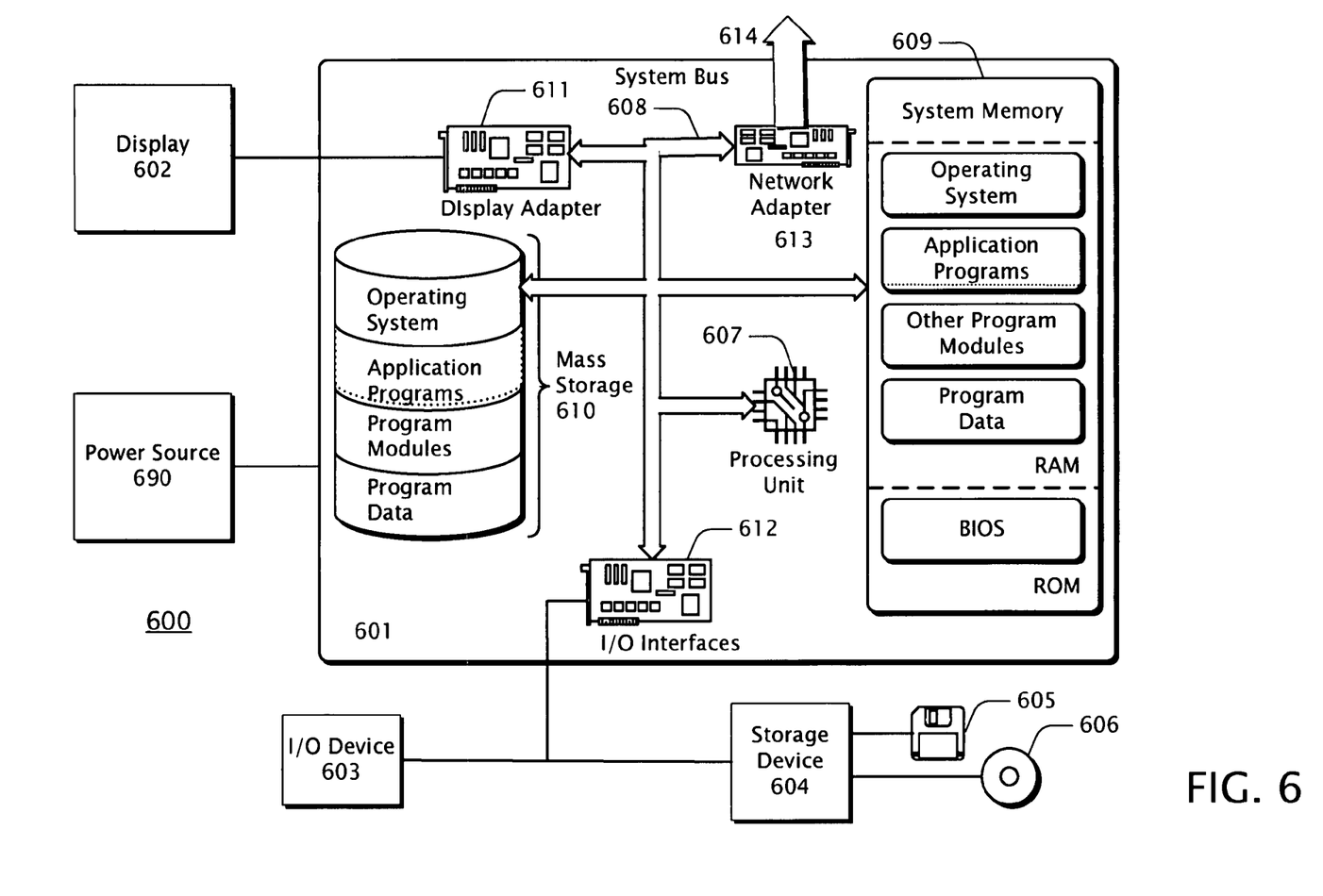
FIG. 6 is a block diagram showing an example computing environment in which the technologies described herein may be implemented.

FIG. 6 is a block diagram showing an example computing environment 600 in which the technologies described herein may be implemented. A suitable computing environment may be implemented with numerous general purpose or special purpose systems. Examples of well known systems may include, but are not limited to, cell phones, digital cameras, personal digital assistants ("PDA"), personal computers ("PC"), hand-held or laptop devices, microprocessor-based systems, multiprocessor systems, servers, workstations, consumer electronic devices, set-top boxes, and the like.

Computing environment 600 typically includes a general-purpose computing system in the form of a computing device 601 coupled to various components, such as peripheral devices 602, 603, 604 and the like. System 600 may couple to various other components, such as input devices 603, including voice recognition, touch pads, buttons, keyboards and/or pointing devices, such as a mouse or trackball, via one or more input/output ("I/O") interfaces 612. The components of computing device 601 may include one or more processors (including central processing units ("CPU"), graphics processing units ("GPU"), microprocessors ("μP"), and the like) 607, system memory 609, and a system bus 608 that typically couples the various components. Processor 607 typically processes or executes various computer-executable instructions to control the operation of computing device 601 and to communicate with other electronic and/or computing devices, systems or environment (not shown) via various communications connections such as a network connection 614 or the like. System bus 608 represents any number of several types of bus structures, including a memory bus or memory controller, a peripheral bus, a serial bus, an accelerated graphics port, a processor or local bus using any of a variety of bus architectures, and the like.

System memory 609 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 609 typically stores data, computer-executable instructions and/or program modules comprising computer-executable instructions that are immediately accessible to and/or presently operated on by one or more of the processors 607.

Mass storage devices 604 and 610 may be coupled to computing device 601 or incorporated into computing device 601 via coupling to the system bus. Such mass storage devices 604 and 610 may include non-volatile RAM, a magnetic disk drive which reads from and/or writes to a removable, non-volatile magnetic disk (e.g., a "floppy disk") 605, and/or an optical disk drive that reads from and/or writes to a non-volatile optical disk such as a CD ROM, DVD ROM 606. Alternatively, a mass storage device, such as hard disk 610, may include non-removable storage medium. Other mass storage devices may include memory cards, memory sticks, tape storage devices, and the like.

Any number of computer programs, files, data structures, and the like may be stored in mass storage 610, other storage devices 604, 605, 606 and system memory 609 (typically limited by available space) including, by way of example and not limitation, operating systems, application programs, data files, directory structures, computer-executable instructions, and the like.

Output components or devices, such as display device 602, may be coupled to computing device 601, typically via an interface such as a display adapter 611. Output device 602 may be a liquid crystal display ("LCD"). Other example output devices may include printers, audio outputs, voice outputs, cathode ray tube ("CRT") displays, tactile devices or other sensory output mechanisms, or the like. Output devices may enable computing device 601 to interact with human operators or other machines, systems, computing environments, or the like. A user may interface with computing environment 600 via any number of different I/O devices 603 such as a touch pad, buttons, keyboard, mouse, joystick, game pad, data port, and the like. These and other I/O devices may be coupled to processor 607 via I/O interfaces 612 which may be coupled to system bus 608, and/or may be coupled by other interfaces and bus structures, such as a parallel port, game port, universal serial bus ("USB"), fire wire, infrared ("IR") port, and the like.

Computing device 601 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 601 may be coupled to a network via network adapter 613 or the like, or, alternatively, via a modem, digital subscriber line ("DSL") link, integrated services digital network ("ISDN") link, Internet link, wireless link, or the like.

Communications connection 614, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 690, such as a battery or a power supply, typically provides power for portions or all of computing environment 600. In the case of the computing environment 600 being a mobile device or portable device or the like, power source 690 may be a battery. Alternatively, in the case computing environment 600 is a desktop computer or server or the like, power source 690 may be a power supply designed to connect to an alternating current ("AC") source, such as via a wall outlet.

Some mobile devices may not include many of the components described in connection with FIG. 6. For example, an electronic badge may be comprised of a coil of wire along with a simple processing unit 607 or the like, the coil configured to act as power source 690 when in proximity to a card reader device or the like. Such a coil may also be configure to act as an antenna coupled to the processing unit 607 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 602, I/O device 603, or many of the other components described in connection with FIG. 6. Other mobile devices that may not include many of the components described in connection with FIG. 6, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A system configured for generating a probabilistic similarity measure based on a first intensity value and a second intensity value of a digital image, the system comprising:
    a computing device;
    a noise characterization module configured for determining noise characteristics of a camera producing the digital image and configured for forming a noise curve descriptive of the noise characteristics;
    a comparison module configured for calculating a probability of correspondence, based at least in part on the noise curve, for each possible true intensity value of a set of possible true intensity values wherein each of the probabilities of correspondence indicate similarity between the first intensity value and the second intensity value relative to the corresponding possible true intensity value; and
    an integration module implemented at least in part by the computing device and configured for performing an integration of the probabilities of correspondence resulting in a probabilistic similarity measure that is a probability that the first intensity value and the second intensity value correspond to the same intensity value.

2. The system of claim 1 wherein the integration is of the form:

$$S(I_1, I_2) = \int_\Omega p(I_1|I')p(I_2|I')p(I')dI'$$

where $S(I_1, I_2)$ is the probabilistic similarity measure, and where $\Omega$ represents the set of possible true intensity values, and where $I_1$ is the first intensity value, and where $I_2$ is the second intensity value.

3. The system of claim 1 wherein the noise curve is iteratively centered on each of the possible true intensity values and, for each of the possible true intensity values, reading a first amplitude value on the noise curve at the first intensity value and reading a second amplitude value on the noise curve at the second intensity value.

4. The system of claim 3 wherein, for each of the possible true intensity values, the first amplitude value and the second amplitude value are multiplied together resulting in the probability of correspondence relative to the corresponding possible true intensity value.

5. The system of claim 1 further comprising an integration module configured for performing an integration of the probabilities of correspondence resulting in a probabilistic similarity measure that is a probability that the first intensity value and the second intensity value correspond to the same intensity value, and wherein the first intensity value is a first intensity vector, and wherein the second intensity value is a second intensity vector.

6. The system of claim 5 wherein the integration is of the form:

$$S(v_1, v_2) = \int_{\Omega_v} p(v_1|v')p(v_2|v')pv'dv'$$

where $S(v_1, v_2)$ is the probabilistic similarity measure, and where $\Omega_v$ represents the set of possible true intensity values for each element in the first intensity vector and the second intensity vector, and where $v_1$ is the first intensity vector, and where $v_2$ is the second intensity vector.

7. A method of comparing a first intensity value and a second intensity value, the method comprising:
    determining noise characteristics of a camera providing the first intensity value and the second intensity value;
    forming a noise curve that represents the noise characteristics;
    evaluating the first intensity value and the second intensity value for each possible true intensity value of a set of possible true intensity values using the noise curve, the evaluating resulting in a set of probabilities of correspondence with one probability of correspondence for each possible true intensity value; and
    integrating, by a computer, the set of probabilities of correspondence resulting in a probabilistic similarity measure that is a probability that the first intensity value and the second intensity value correspond to the same intensity value.

8. The method of claim 7 wherein the integrating is of the form:

$$S(I_1, I_2) = \int_\Omega p(I_1|I')p(I_2|I')p(I')dI'$$

where $S(I_1, I_2)$ is the probabilistic similarity measure, and where $\Omega$ represents the set of possible true intensity values, and where $I_1$ is the first intensity value, and where $I_2$ is the second intensity value.

9. The method of claim 7 further comprising integrating the set of probabilities of correspondence resulting in a probabilistic similarity measure that is a probability that the first intensity value and the second intensity value correspond to the same intensity value, and wherein the first intensity value is a first intensity vector, and wherein the second intensity value is a second intensity vector.

10. The method of claim 9 wherein the integrating is of the form:

$$S(v_1, v_2) = \int_{\Omega_v} p(v_1|v')p(v_2|v')pv'dv'$$

where $S(v_1, v_2)$ is the probabilistic similarity measure, and where $\Omega_v$ represents the set of possible true intensity values for each element in the first intensity vector and the second intensity vector, and where $v_1$ is the first intensity vector, and where $v_2$ is the second intensity vector.

11. The method of claim 7, the evaluating further comprising, for each of the possible true intensity values:
 centering the noise curve on the possible true intensity value;
 reading a first amplitude value on the noise curve at the first intensity value;
 reading a second amplitude value on the noise curve at the second intensity value; and
 calculating the probability of correspondence for the possible true intensity value based on the first amplitude value and the second amplitude value.

12. At least one tangible computer-readable storage device storing computer-executable instructions that, when executed by a computer, cause the computer to perform a method of comparing a first intensity value and a second intensity value, the method comprising:
 determining noise characteristics of a camera providing the first intensity value and the second intensity value;
 forming a noise curve that represents the noise characteristics;
 evaluating the first intensity value and the second intensity value for each possible true intensity value of a set of possible true intensity values using the noise curve, the evaluating resulting in a set of probabilities of correspondence with one probability of correspondence for each possible true intensity value; and
 integrating the set of probabilities of correspondence resulting in a probabilistic similarity measure that is a probability that the first intensity value and the second intensity value correspond to the same intensity value.

13. The at least one tangible computer-readable storage device of claim 12 wherein the integrating is of the form:

$$S(I_1, I_2) = \int_{\Omega} p(I_1|I')p(I_2|I')p(I')dI'$$

where $S(I_1, I_2)$ is the probabilistic similarity measure, and where $\Omega$ represents the set of possible true intensity values, and where $I_1$ is the first intensity value, and where $I_2$ is the second intensity value, and where p(I') is a constant.

14. The at least one tangible computer-readable storage device of claim 12, the method further comprising integrating the set of probabilities of correspondence resulting in a probabilistic similarity measure that is a probability that the first intensity value and the second intensity value correspond to the same intensity value, and wherein the first intensity value is a first intensity vector, and wherein the second intensity value is a second intensity vector.

15. The at least one tangible computer-readable storage device of claim 14 wherein the integrating is of the form:

$$S(v_1, v_2) = \int_{\Omega_v} p(v_1|v')p(v_2|v')pv'dv'$$

where $S(v_1, v_2)$ is the probabilistic similarity measure, and where $\Omega_v$ represents the set of possible true intensity values for each element in the first intensity vector and the second intensity vector, and where $v_1$ is the first intensity vector, and where $v_2$ is the second intensity vector.

16. The at least one tangible computer-readable storage device of claim 12, the evaluating further comprising, for each of the possible true intensity values:
 centering the noise curve on the possible true intensity value;
 reading a first amplitude value on the noise curve at the first intensity value;
 reading a second amplitude value on the noise curve at the second intensity value; and
 calculating the probability of correspondence for the possible true intensity value based on the first amplitude value and the second amplitude value.

17. The at least one tangible computer-readable storage device of claim 12, the evaluating further comprising utilizing weighted averages of a plurality of pixel intensities of corresponding overlapped pixels, wherein the plurality of pixel intensities comprise the second intensity value.

* * * * *